(12) United States Patent
Nakayama (10) Patent No.: US 11,193,749 B2
(45) Date of Patent: Dec. 7, 2021

(54) SURFACE PROPERTY MEASURING METHOD AND SURFACE PROPERTY MEASURING DEVICE

(71) Applicant: MITUTOYO CORPORATION, Kanagawa (JP)

(72) Inventor: Tatsuki Nakayama, Hiroshima (JP)

(73) Assignee: MITUTOYO CORPORATION, Kanagawa (JP)

( * ) Notice: Subject to any disclaimer, the term of this patent is extended or adjusted under 35 U.S.C. 154(b) by 245 days.

(21) Appl. No.: 16/655,811

(22) Filed: Oct. 17, 2019

(65) Prior Publication Data

US 2020/0132429 A1 Apr. 30, 2020

(30) Foreign Application Priority Data

Oct. 31, 2018 (JP) .............................. JP2018-204760

(51) Int. Cl.
 *G01B 5/28* (2006.01)
 *G01B 5/20* (2006.01)
(52) U.S. Cl.
 CPC . *G01B 5/28* (2013.01); *G01B 5/20* (2013.01)
(58) Field of Classification Search
 CPC ........................................................ G01B 5/28
 USPC ............................................. 33/501.06, 551
 See application file for complete search history.

(56) References Cited

U.S. PATENT DOCUMENTS

| 6,874,243 | B2* | 4/2005 | Hama | ...................... G01B 5/28 |
| | | | | 33/551 |
| 8,701,301 | B2* | 4/2014 | Nakayama | ........... G01B 5/0016 |
| | | | | 33/554 |
| 8,915,124 | B2 | 12/2014 | Nakayama | |
| 9,803,968 | B2* | 10/2017 | Nakayama | ............. G01B 5/201 |
| 9,921,044 | B2* | 3/2018 | Nakayama | ............... G01B 5/28 |
| 9,933,248 | B2* | 4/2018 | Mariller | ................... G01B 5/14 |
| 9,933,277 | B2* | 4/2018 | Terauchi | .................. G01D 5/04 |
| 10,584,981 | B2* | 3/2020 | Kajihara | .................. G01B 5/28 |
| 10,830,567 | B2* | 11/2020 | Angood | ................. B25J 9/0066 |
| 11,085,752 | B2* | 8/2021 | Nakayama | ............. G01B 3/008 |
| 2014/0237834 | A1* | 8/2014 | Matsumiya | .............. G01B 5/28 |
| | | | | 33/503 |

(Continued)

FOREIGN PATENT DOCUMENTS

JP 2012-225742 A 11/2012
JP 2014-185985 A 10/2014

(Continued)

OTHER PUBLICATIONS

U.S. Appl. No. 16/593,277 to Tatsuki Nakayama, filed Oct. 4, 2019.

*Primary Examiner* — George B Bennett
(74) *Attorney, Agent, or Firm* — Greenblum & Bernstein, P.L.C.

(57) ABSTRACT

The present disclosure uses a surface property measuring device that includes an arm swingably supported so as to displace a stylus vertically, and an arm lifter that holds the stylus at a predetermined height by rotating the arm. After arranging the arm lifter in a state where the arm can be held at a lower limit height that is only a predetermined drop amount below a predetermined measurement height, the arm is arranged at the measurement height and the stylus contacts a measured object, and in this state surface properties of the measured object are measured.

13 Claims, 6 Drawing Sheets

(56) References Cited

U.S. PATENT DOCUMENTS

2014/0283402 A1 9/2014 Hidaka et al.
2014/0326057 A1 11/2014 Nakayama
2018/0299247 A1 10/2018 Honda et al.

FOREIGN PATENT DOCUMENTS

JP 2014-219216 A 11/2014
JP 6133678 B2 5/2017

* cited by examiner

SURFACE PROPERTY MEASURING METHOD AND SURFACE PROPERTY MEASURING DEVICE

CROSS-REFERENCE TO RELATED APPLICATIONS

The present application claims priority under 35 U.S.C. § 119 of Japanese Application No. 2018-204760, filed on Oct. 31, 2018, the disclosure of which is expressly incorporated by reference herein in its entirety.

BACKGROUND OF INVENTION

1. Field of the Invention

The present invention relates to a surface property measuring method and a surface property measuring device.

2. Description of Related Art

A surface property measuring device is known which measures surface properties (contour configuration, surface roughness, undulations, and the like) of a measured object (measurable object) by performing tracing scanning of a surface of the measured object with a stylus (see Japanese Patent Laid-open Publication No. 2012-225742). The surface property measuring device disclosed in Japanese Patent Laid-open Publication No. 2012-225742 includes a measuring arm that is supported so as to be capable of circular arced movement, a stylus that is provided to a forefront end of the measuring arm, a measurement force applier that exerts a force on the measuring arm such that the stylus contacts the measured object with a predetermined measurement force, a displacement mechanism that causes the measuring arm to displace relative to a stage, and a displacement detector that detects a change in position due to the circular arced motion of the measuring arm.

There is an angle that is a boundary to where the surface property measuring device can track while the measuring arm performs scanning displacement (tracking limit angle). That is, when an inclination angle of a measured surface is gentle (inclination angle is equal to or less than the tracking limit angle), the stylus can perform scanning displacement while in contact with the measured surface at a constant measurement force. Meanwhile, when the inclination angle of the measured surface exceeds the tracking limit angle, the stylus is unable to track along the incline of the measured surface, and floats up and away from the measured surface, after which the stylus once again closely approaches and collides with the measured surface (referred to as a drop of the measuring arm). When a drop of the measuring arm occurs, there is a possibility that the stylus and the measured object may be damaged from the collision. In response to this, the applicant of the present application has proposed a surface property measuring device that can prevent an unfavorable situation such as the stylus colliding with the measured object (see Japanese Patent No. 6133678).

The surface property measuring device disclosed in Japanese Patent No. 6133678 includes a measurement force instruction portion that outputs a measurement force instruction that issues an instruction for an orientation and size of a measurement force, and a measurement force controller that controls the orientation and size of the measurement force produced by a measurement force applier by applying a control signal to the measurement force applier. The measurement force controller has a configuration in which a displacement detection signal from the displacement detector is monitored and when a displacement speed of the measuring arm is equal to or less than a predetermined threshold value, the control signal is applied to the measurement force applier so as to produce a measurement force with the orientation and size corresponding to the measurement force instruction, and when the displacement speed of the measuring arm exceeds the predetermined threshold value, feedback is applied such that the measurement force applier produces a force in a direction that lifts the forefront end of the measuring arm upward. Thus, according to the surface property measuring device disclosed in Japanese Patent No. 6133678, even when the displacement speed of the measuring arm exceeds the predetermined threshold value (when the drop of the measuring arm occurs), feedback can be applied so as to produce in the measurement force applier the force in a direction that lifts the forefront end of the measuring arm upward, and the drop of the measuring arm in which the stylus may collide with the measured object can be suppressed.

Apart from damage prevention due to the drop during measurement, a surface property measuring device is known in which an arm lifter is provided for switching an arm posture (see Japanese Patent Laid-open Publication No. 2014-185985). The surface property measuring device disclosed in Japanese Patent Laid-open Publication No. 2014-185985 is configured to be held at a separation position, an intermediate position, a measurement position, and a pause position by rotating an arm using a cam-type arm lifter. Of these positions, at the measurement position, a measurement can be performed by the stylus contacting the measured object. On the other hand, at the separation position, contact with the stylus is avoided when the measured object is placed or removed, for example, by drawing the stylus back from the measured object by a large amount. Further, the intermediate position is set between the measurement position and the separation position with the arm in a substantially horizontal state for introduction to a hole or the like to be measured. Meanwhile, in order to prevent damage while in storage, the pause position set to hold the stylus lower than the measurement position to protect from contact with an exterior portion.

The surface property measuring device of Japanese Patent Laid-open Publication No. 2014-185985 is able to prevent damage to the stylus while in storage, but is unable to cope with the drop of the arm during measurement. On the other hand, according to the surface property measuring device of Japanese Patent No. 6133678, the drop of the arm during measurement can be prevented, but this requires monitoring the displacement speed of the measuring arm and controlling the measurement force applied to the measuring arm, and therefore the devices cannot be applied when those configurations are not desired.

SUMMARY OF THE INVENTION

The present invention provides a surface property measuring method and a surface property measuring device that can prevent a drop of an arm during measurement without monitoring a displacement speed of a measuring arm and without controlling a measurement force applied to the measuring arm.

A surface property measuring method of the present invention uses a surface property measuring device that includes an arm swingably supported so as to displace a stylus vertically, and an arm lifter that holds the stylus at a predetermined height by rotating the arm. After arranging the arm lifter in a state where the arm can be held at a lower limit height that is only a predetermined drop amount below a predetermined measurement height, the arm is arranged at the measurement height and the stylus contacts a measured object, and in this state surface properties of the measured object are measured.

In the present invention configured in this way, there is a large step on a surface of the measured object and even when the arm drops from the measurement height, the arm is locked by the arm lifter arranged at the lower limit height and damage to the stylus due to a further drop can be prevented. In the present invention, the drop of the arm is prevented by providing the arm lifter and a configuration can be simplified without requiring an additional configuration in the device. Also, the arm lifter mechanically locks the dropping arm and therefore, the drop of the arm can be reliably prevented. Accordingly, the drop of the arm during measurement can be prevented without monitoring the displacement speed of the arm and without controlling the measurement force applied to the measuring arm. In the present invention, the predetermined measurement height may be defined as desired and defined as appropriate according to the measured object and the like on which the arm performs a scanning measurement. In addition, the predetermined drop amount and the lower limit height may also be defined as desired, and according to the step of the measured object on which the scanning measurement is performed, a height of the drop may be defined as appropriate such that the stylus is not damaged when the arm drops.

In the surface property measuring method of the present invention, the surface property measuring device preferably includes a measuring instrument main body in which the arm and the arm lifter are installed, and a displacement mechanism capable of displacing the measuring instrument main body relative to the measured object. In the measuring instrument main body, after arranging the arm lifter in a state where the arm can be held at the lower limit height, by displacing the measuring instrument main body with the displacement mechanism, the stylus contacts the measured object and the arm is arranged at the measurement height. In this state, the surface properties of the measured object are measured.

In the present invention configured in this way, the arm can be arranged at the measurement height of the measured object by the displacement mechanism for the measuring instrument main body. In other words, because the arm lifter is arranged at the lower limit height in preparation for the drop of the arm, the arm lifter which is already arranged at the predetermined height cannot be used for an operation to arrange the arm at the measurement height. In response, in the present invention, by using the displacement mechanism for the measuring instrument main body, the arm can be arranged at the measurement height of the measured object without using the arm lifter. Accordingly, a drop of the arm due to the arm lifter can be reliably prevented.

In the surface property measuring method of the present invention, the lower limit height and the measurement height are preferably defined beforehand from design information of the measured object. The lower limit height and the measurement height according to the present invention may use a value obtained from a detection device by bringing the arm into proximity with the actual measured object. However, when there is a step in an inner surface of a cylindrical measured object, for example, it is difficult to visually check the state of the arm with respect to the step and there is a possibility that a proper definition of the lower limit height cannot be performed. In response, the drop of the arm can be prevented efficiently and reliably by calculating and defining the measurement height and the lower limit height from the design information of the measured object.

In the surface property measuring method of the present invention, a height position of the arm is preferably obtained from one of a scale detecting an oscillation position of the arm and an encoder detecting a rotation angle position of a rotation cam of the arm lifter. In the present invention, the scale detecting the oscillation position of the arm is typically installed in a surface property measuring device, and is preferred because the scale can be easily used and the height position of the arm can be directly obtained. On the other hand, when the arm lifter is a type that uses a rotation cam, the height position of the arm is calculated from an output of the encoder detecting the rotation angle position, or the height position of the arm may be retrieved using a data table.

In the surface property measuring method of the present invention, by referencing the height of the arm obtained by the scale or the encoder while operating the arm lifter in a state where the arm is held, the arm lifter is preferably arranged in a state where the arm can be held at the lower limit height when the arm is separated from the arm lifter after the arm is arranged at this lower limit height.

In the present invention configured in this way, for example, a user can rotate the arm by way of the arm lifter while looking at the stylus, and when the stylus reaches the desired lower limit height, the value of the arm height at the time can be stored as the lower limit height, and the stored lower limit height can be retrieved during a measurement operation, and the arm lifter can be arranged at the lower limit height.

The surface property measuring device of the present invention includes an arm swingably supported so as to displace a stylus vertically, an arm lifter that holds the stylus at a predetermined height by rotating the arm, a measuring instrument main body in which the arm and the arm lifter are installed, a displacement mechanism capable of displacing the measuring instrument main body relative to the measured object, and a control device controlling the arm, the arm lifter, and the displacement mechanism. The control device arranges the arm lifter in the measuring instrument main body in a state where the arm can be held at the lower limit height that is only a predetermined drop amount below the predetermined measurement height, after which the measuring instrument main body is displaced by the displacement mechanism, whereby the stylus contacts the measured object and the arm is arranged at the measurement height. In this state, the surface properties of the measured object are measured. With the surface property measuring device according to the present invention that is configured in this way, the effects described above for the surface property measuring method according to the present invention can be obtained.

The present invention provides a surface property measuring method and a surface property measuring device that can prevent a drop of an arm during measurement without monitoring a displacement speed of a measuring arm and without controlling a measurement force applied to the measuring arm.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
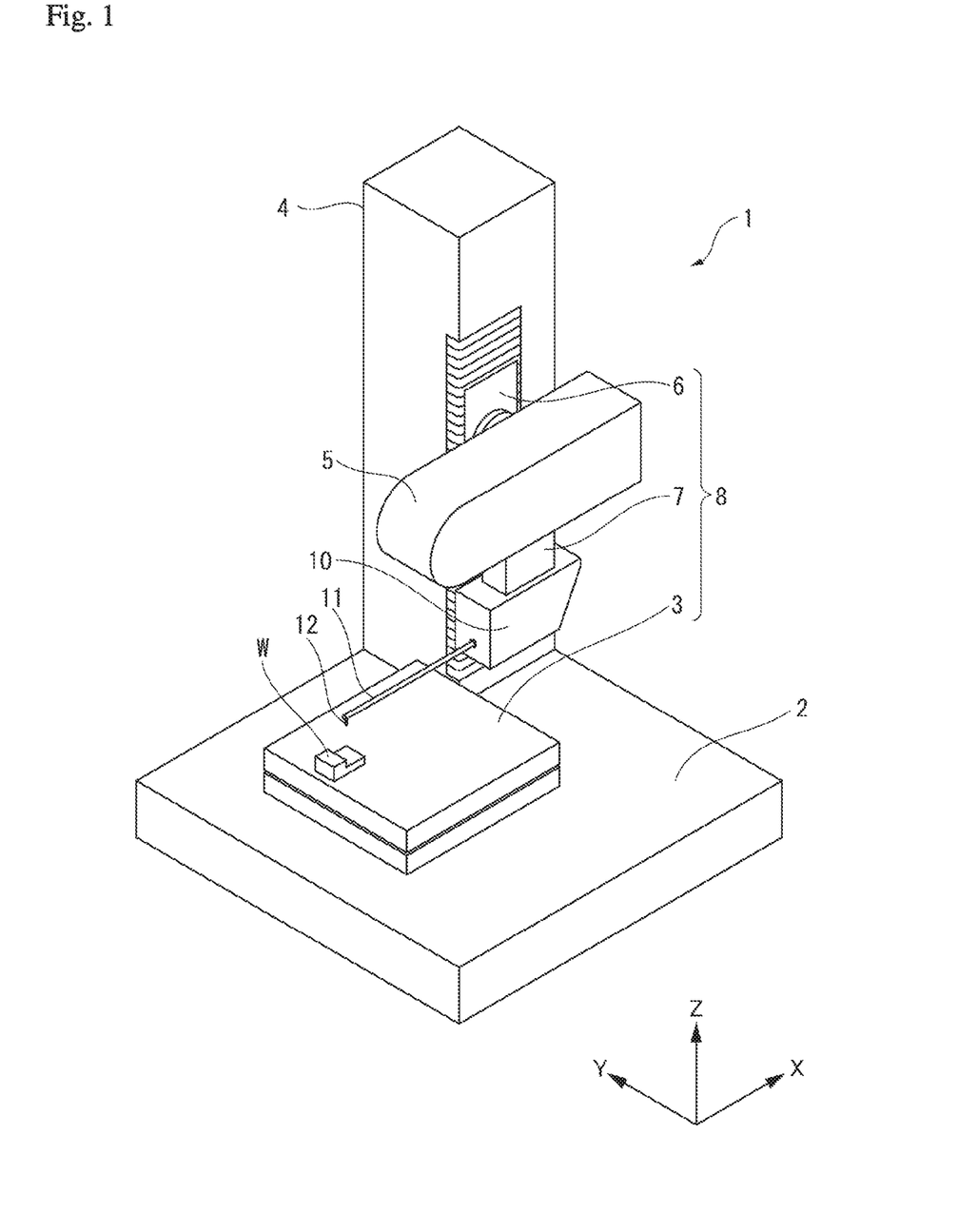
FIG. 1 is a perspective view of a surface property measuring device according to an embodiment of the present invention.

Hereafter, an embodiment of the present invention is described with reference to the drawings. In FIG. 1, a surface property measuring device 1 includes a placement stage 3 on a top surface of a device main body 2 and a column 4. A measured object (measurable object or object to be measured) W is placed on a top surface of the placement stage 3. The top surface of the placement stage 3 can be displaced in two directions (X-axis direction and Y-axis direction) horizontal to the device main body 2. The column 4 includes a case 5 on a side surface, and a measuring instrument main body 10 is suspendedly supported on a bottom surface of the case 5.

The case 5 can be displaced in a vertical Z-axis direction by an elevator mechanism 6 accommodated in the column 4. Also, a drive mechanism 7 for measurement is accommodated in the case 5 and the suspendedly supported measuring instrument main body 10 can be driven in the X-axis direction which is a direction of a scanning measurement. The elevator mechanism 6, the drive mechanism 7, and the placement stage 3 configure a displacement mechanism 8. The measuring instrument main body 10 and the measured object W are capable of relative displacement in three dimensions due to the displacement mechanism 8. In the measuring instrument main body 10, an arm 11 for measurement is swingably supported and a stylus 12 is formed on a forefront end of the arm 11, the stylus 12 being capable of contacting the measured object W.

Figure 2:
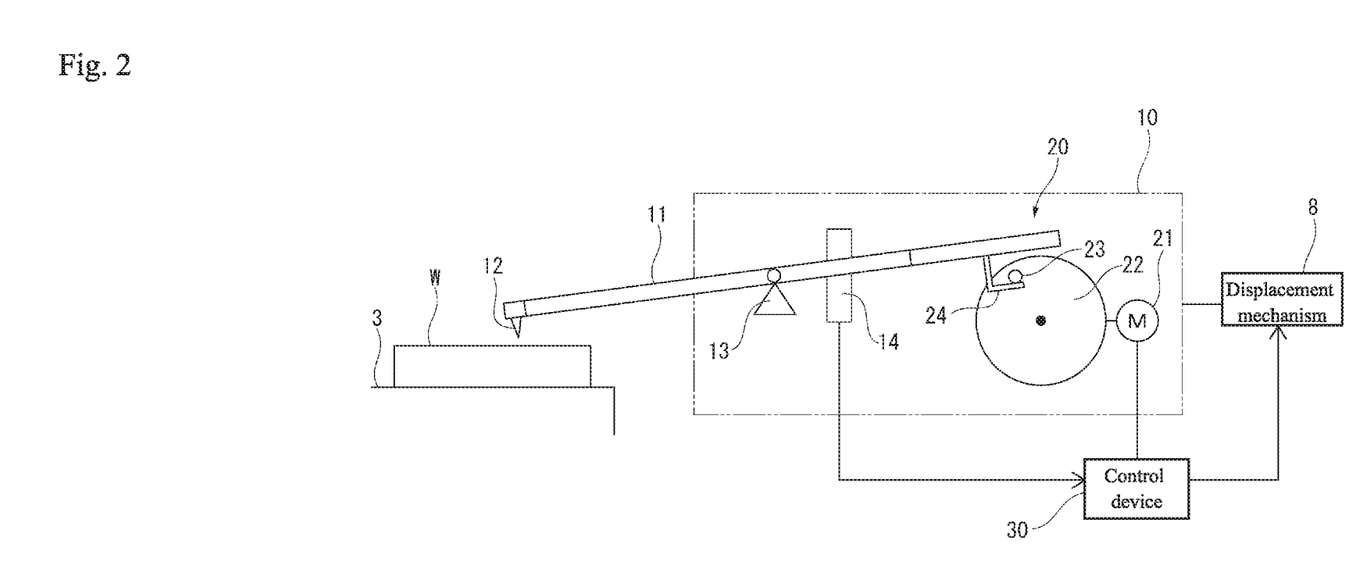
FIG. 2 illustrates a schematic view of a measurement mode according to the embodiment.

In FIG. 2, the measuring instrument main body 10 includes a support structure 13 that swingably supports the arm 11, and is also provided with a scale 14 detecting an oscillation angle position of the arm 11. Further, an arm lifter 20 that changes the oscillation angle of the arm 11 according to an operation mode is installed in the measuring instrument main body 10. The arm lifter 20 includes a cam 22 that is driven to rotate by a motor 21 and a pin 23 is installed on the cam 22. A lever 24 is formed on the arm 11 to engage with the pin 23 and the arm 11 can oscillate to a predetermined angle position by rotating the cam 22.

A control device 30 is connected to the measuring instrument main body 10. The control device 30 controls the surface property measuring device 1 by running a predetermined operation program, and the control device 30 performs operation control of the motor 21 of the arm lifter 20, operation control of the displacement mechanism 8, and signal processing from the scale 14, respectively. The control device 30 can detect the oscillation angle position of the arm 11 from the detection signal from the scale 14 and a height position of the stylus 12 can be calculated from the angle position. On the other hand, the control device 30 can switch the arm 11 to various operation modes noted below by controlling the motor 21 of the arm lifter 20.

Figure 3:
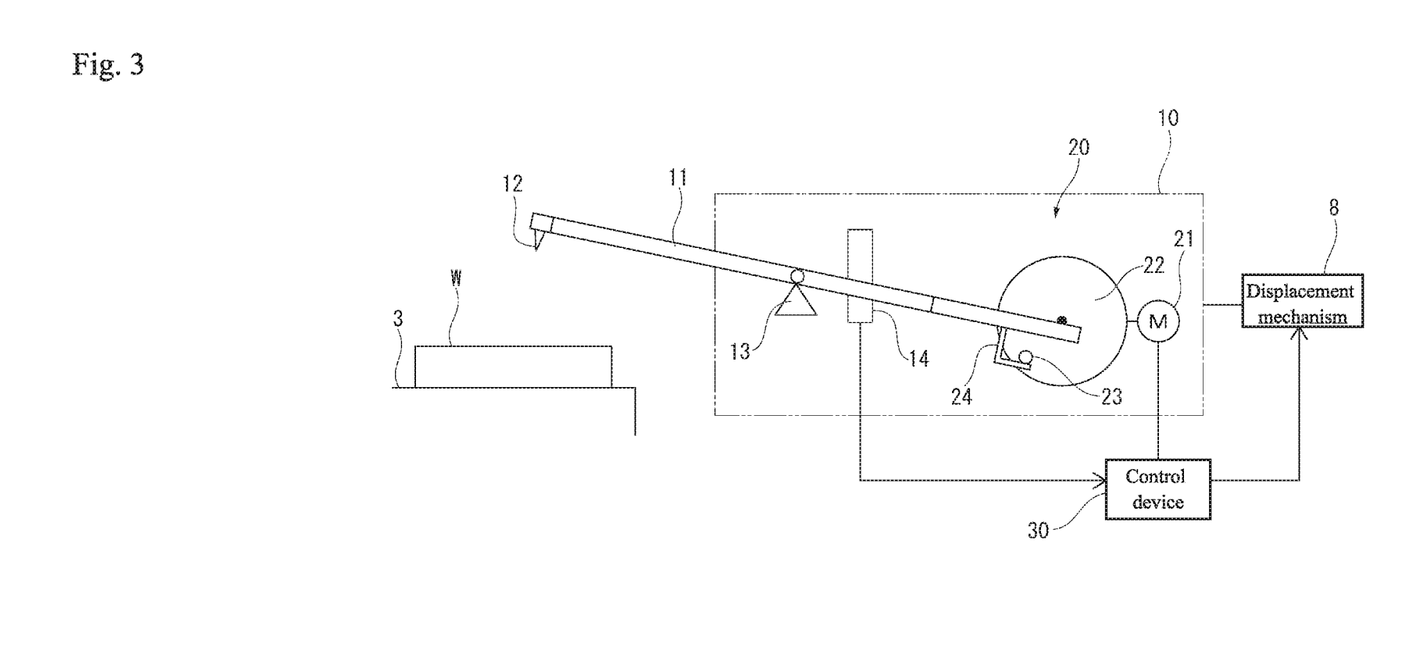
FIG. 3 illustrates a schematic view of a retreating mode according to the embodiment.

In FIG. 2, the pin 23 of the arm lifter 20 is on an upper side of the cam 22 and the side of the arm 11 where the lever 24 is provided is lifted. As a result, the forefront end side of the arm 11 descends and the stylus 12 can contact the surface of the measured object W. This state is a "measurement mode" for performing the scanning measurement of the surface of the measured object W. In the measurement mode, the stylus 12 has the widest range of motion and the oscillation angle of the arm 11 that can be detected by the scale 14 covers almost the entire region. In FIG. 3, the pin 23 of the arm lifter 20 is displaced to a lower side of the cam 22 and the lever 24 of the arm 11 is pressed down. As a result, the forefront end side of the arm 11 is lifted and the stylus 12 is held at a position where the stylus 12 is apart from the measured object W (mechanical upper limit on displacement). This state is a "retreating mode" that is suitable when the measured object W is attached/detached.

Figure 4:
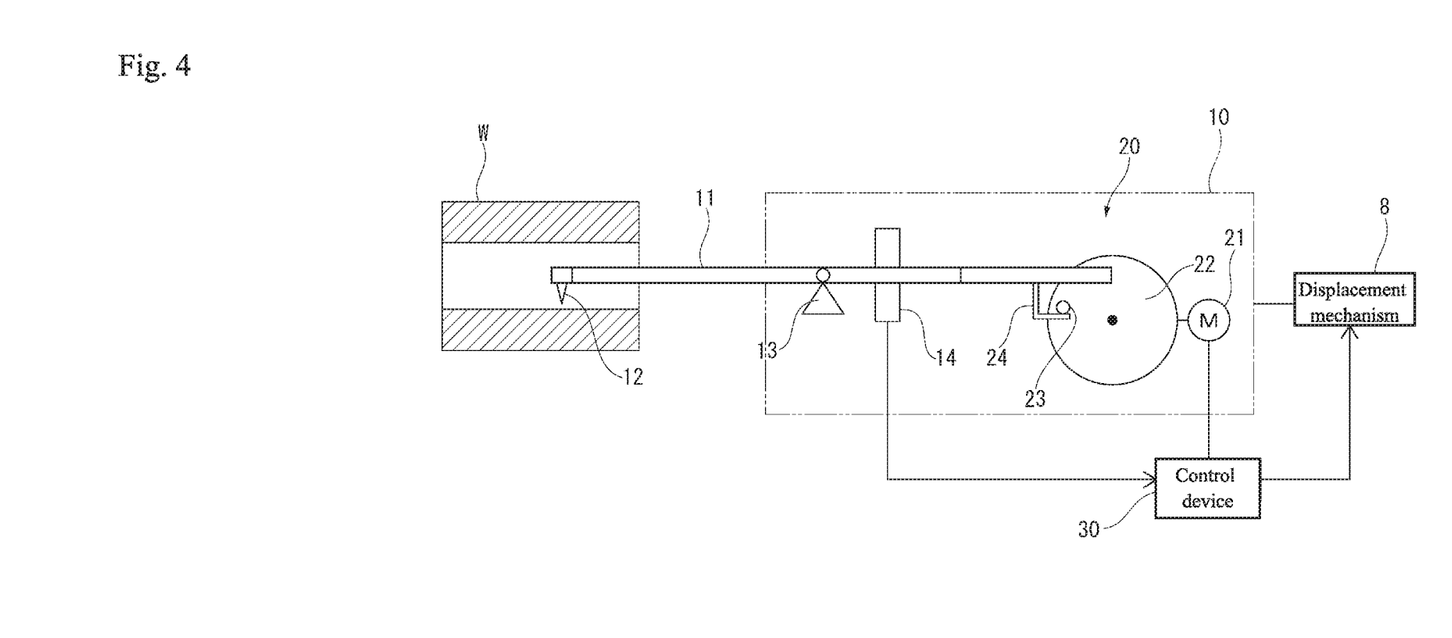
FIG. 4 illustrates a schematic view of an intermediate mode according to the embodiment.

In FIG. 4, the surface property measuring device 1 establishes an "intermediate mode" between the measurement mode and the retreating mode noted above. In the intermediate mode, the pin 23 of the arm lifter 20 is retained at an intermediate height of the cam 22 and the arm 11 (from the lever 24 side to the stylus 12 side) is held in a substantially horizontal state. By setting the intermediate mode, when measuring the inner side surface of the measured object W, for example, the forefront end of the arm 11 can be introduced to the inner side of the cylindrical measured object W. The angle of the arm 11 in the intermediate mode can be appropriately adjusted and various intermediate modes having different angles can be established. These intermediate modes can be established in the control device 30.

Figure 5:
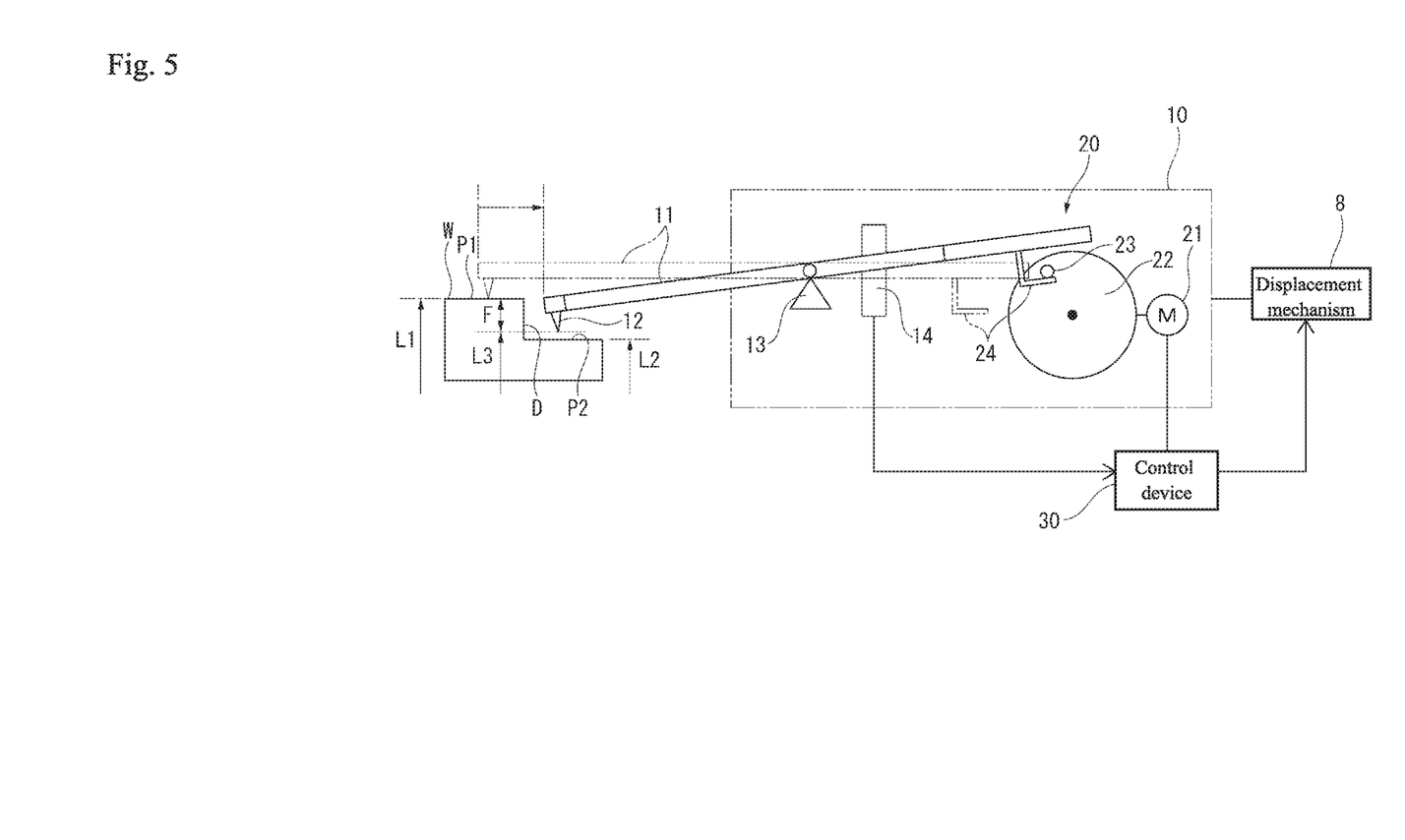
FIG. 5 illustrates a schematic view of a drop prevention setting according to the embodiment.

In the present embodiment, a displacement lower limit of the arm 11 is defined using a function of the intermediate mode noted above, and a function is achieved that prevents the drop of the arm 11 when performing the scanning measurement of the measured object W that includes a step D. In FIG. 5, the measured object W has the step D between a surface P1 of a height L1 and a surface P2 of a height L2. Therefore, when performing the scanning measurement of the surface P1 using the stylus 12 of the arm 11, the drop of the arm 11 occurs at the step D and the stylus 12 may collide With the surface P2 and damage may be caused.

In response, in the present embodiment, the height L1 of the measured object W is defined as a measurement height L1 and a lower limit height L3 is defined to be below the measurement height L1 by a predetermined drop amount F and both are set in the control device 30. Then, after arranging the arm lifter 20 in a state capable of holding the arm 11 at the lower limit height L3 (locking position of the arm 11 of the arm lifter 20 is defined as the lower limit height L3), the arm 11 is arranged at the measurement height L1. In this state, the scanning measurement of the surface P1 is performed by the stylus 12. Specifically, arranging the arm lifter 20 at the lower limit height L3 means that the oscillation range lower limit of the arm 11 is restricted by rotating the cam 22 of the arm lifter 20 such that the range of motion lower limit of the stylus 12 is at L3. The position of the stylus 12 at this time (lower limit height L3) can be recognized by the value of the scale 14. Therefore, while rotating the cam 22 of the arm lifter 20, the value of the scale at the time may be retrieved and adjustment may be performed such that the range of motion lower limit of the stylus 12 becomes the lower limit height L3. This position is an arm holding position (position where the arm 11 is locked) provided by the arm lifter 20 during the measurement mode.

In a state where the arm lifter 20 is arranged at the lower limit height L3, the oscillation position of the arm 11 that is held by the arm lifter 20 can be detected by the scale 14. Alternatively, the oscillation position of the arm 11 can also be calculated from the rotation angle detected by the encoder that is connected to the cam 22. Therefore, the correspondence between the detection value of the scale 14 or the detection value of the encoder of the cam 22 and the height of the arm 11 is stored in a data table and may be retrieved when arranging the arm lifter 20 at the lower limit height L3. As noted above, by arranging the arm lifter 20 at the lower limit height L3, when the arm 11 performing the scanning measurement drops at the step D, the arm 11 is locked at the lower limit height L3 by the arm lifter 20 and the damage to the stylus 12 due to the collision with the surface P2 can be prevented.

When the arm lifter 20 is arranged at the lower limit height L3, the stylus 12 is handled so as not to collide with the surface P1. Specifically, the arm lifter 20 is operated in a state where the stylus 12 is above the surface P2, or the arm lifter 20 is operated while separated from measured object W by displacing the measuring instrument main body 10 with the displacement mechanism 8. On the other hand, when the arm 11 is arranged at the measurement height L1 in a state where the arm lifter 20 is arranged at the lower limit height L3, instead of using the arm lifter 20, the measuring instrument main body 10 is displaced by the displacement mechanism 8 and the forefront end of the arm 11 is lowered from above the measured object W and the stylus 12 contacts the surface P1. Accordingly, the arm 11 can be arranged at the measurement height L1, and the arm lifter 20 can be arranged at the lower limit height L3.

In the present embodiment, in order to arrange the arm lifter 20, and to arrange the arm 11 with the displacement mechanism 8, the measurement height L1 and lower limit height L3 are defined in the control device 30 beforehand. The measurement height L1 and the lower limit height L3 may be defined by reference to the heights L1 and L2 from the design information of the measured object W, or may be defined by actual measurement by causing the arm 11 to approach the actual measured object W. Specifically, in a state where the forefront end of the arm 11 is brought into proximity with the surface P1 of the measured object W and the stylus 12 is brought into contact with the surface P1, the measurement height L1 can be measured by detecting the height of the arm 11 (height of the stylus 12) by the scale 14 and in combination with the coordinate value of the displacement mechanism 8 at that time. Similarly, the height L2 can also be measured by the stylus 12 contacting the surface P2.

On the other hand, the drop amount F is a value smaller than the height of the step D (difference between the height L1 and the height L2), and is defined to a value having a margin capable of avoiding a collision between the stylus 12 and the surface P2 during the drop. The lower limit height L3 is defined by the setting for the drop amount F. For example, when performing the scanning measurement of the surface P1 by the stylus 12 after the stylus 12 is in contact with the surface P1 and the height position of the measuring instrument main body 10 is adjusted such that the value of the scale 14 is zero, the following setting operation is performed prior to the scanning measurement. First, a state is established where the stylus 12 is above the surface P2, or the measuring instrument main body 10 is in a position separated from the surface P1 by displacing the measuring instrument main body 10 with the displacement mechanism 8. Next, the cam 22 of the arm lifter 20 is rotated in a state where the arm held at the intermediate mode, that is, from a state in which the value of the scale 14 is zero toward a direction where the stylus 12 descends (referred to as a negative direction). While the cam 22 is in rotation, the arm 11 is positioned at the oscillation lower limit for each point in time by the arm 11's own weight and the arm 11 is rotated by the rotation of the cam 22, and the value of the scale 14 changes in the negative direction. When the value of the scale 14 reaches −F, the cam 22 stops rotating. Accordingly, the arm lifter 20 can hold the arm 11 so as to displace only to the height to which the stylus 12 displaced in the negative direction by −F and this height is defined as the lower limit height L3.

With the setting operation, noted above, the arm lifter 20 during the scanning measurement is arranged in a state where the arm lifter 20 can hold the arm 11 at the lower limit height L3. When the arm lifter 20 is arranged at the lower limit height L3, while maintaining the state of the arm lifter 20, the measuring instrument main body 10 is displaced by the displacement mechanism 8 and the stylus 12 contacts the surface P1 and the height position of the measuring instrument main body 10 is adjusted such that the value of the scale 14 is zero. At this point, the arm 11 is separated from the arm lifter 20 and is in a state capable of swinging according to a shape of the surface P1. In this state, the stylus 12 can perform the scanning measurement of the surface P1 and even when the arm 11 drops due to the step D while performing the scanning measurement, the arm 11 is locked at the position where the stylus 12 reaches the lower limit height L3 and the arm 11 is held by the arm lifter 20.

When the forefront end of the arm 11 is brought into proximity with the step D of the measured object W and the stylus 12 is arranged below the surface P1 by the drop amount F, the lower limit height L3 can also be obtained by measuring the height of the stylus 12 in this state from the scale 14 and the displacement mechanism 8. For example, on the surface P2, the measuring instrument main body 10 is elevated and lowered by the displacement mechanism 8 while holding the arm 11 in the intermediate mode and adjustment is made so as to be at the height of when the surface P1 was detected (height of the measuring instrument main body 10 when the surface P1 is measured), after which a user can arrange the stylus 12 at the desired lower limit height L3 by a visual observation by rotating the arm 11 with the arm lifter 20. While maintaining this state, the scanning measurement of the surface P1 may be performed by displacing the measuring instrument main body, or the value of the scale 14 at the time may be stored temporarily, and the value may be used when the arm lifter 20 is arranged at the lower limit height L3. However, when the measured object W is in a cylindrical form and there is a step D on an inner surface thereof, for example, it is difficult to visually check the state of the arm 11 with respect to the step D and there is a possibility that a proper definition of the lower limit height L3 cannot be performed. In this case, the lower limit height L3 and the measurement height L1 may be defined by referencing the design information of the measured object W noted above.

Figure 6:
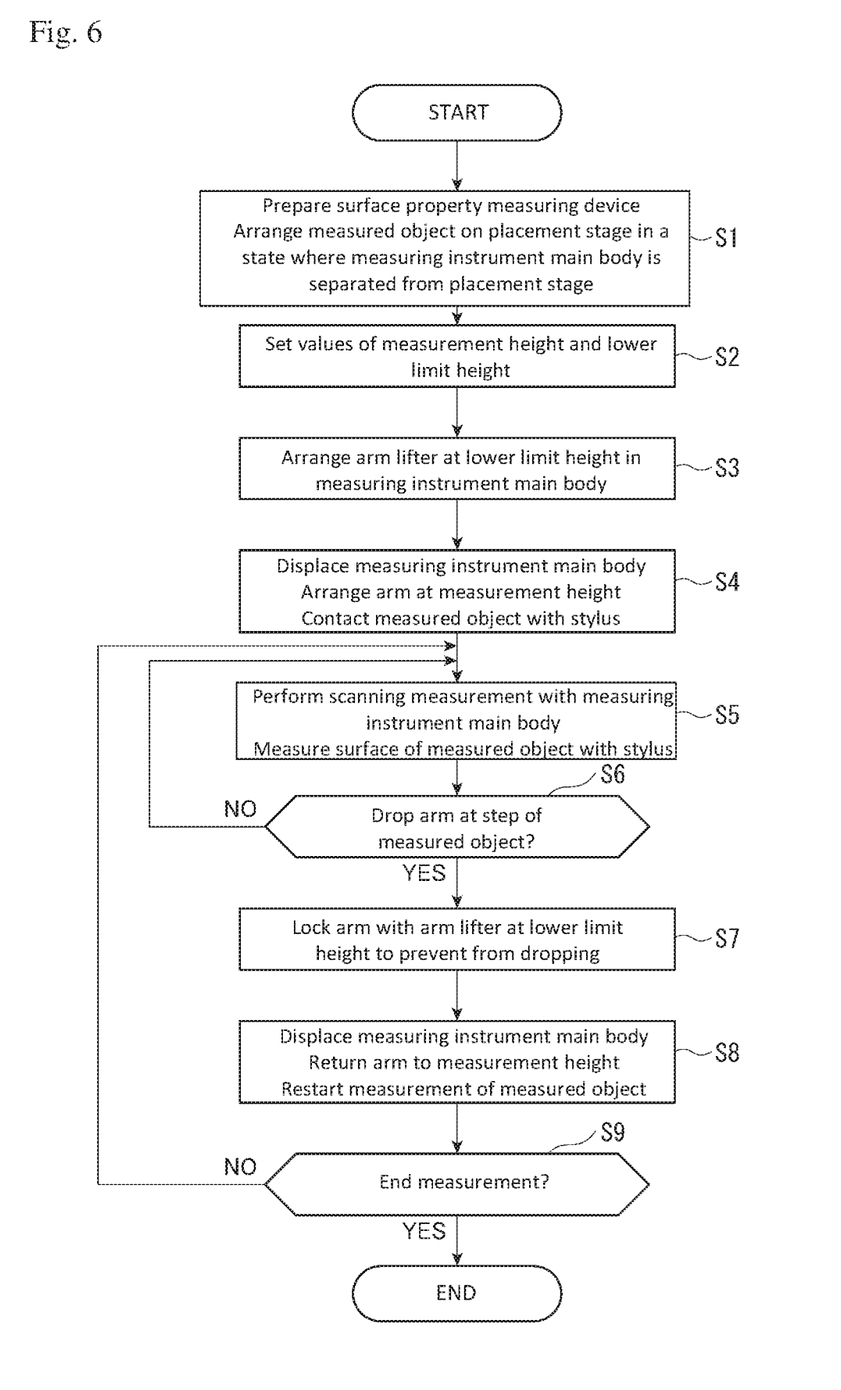
FIG. 6 is a flow chart illustrating a measurement procedure according to the embodiment.

FIG. 6 illustrates a specific procedure of measurement using the surface property measuring device 1 according to the present embodiment. First, when performing the surface property measurement of the measured object W, the surface property measuring device 1 is prepared and the measured object W is arranged on the placement stage 3 in a state where the measuring instrument main body 10 is separated from the placement stage 3 (step S1 in FIG. 6). Next, values for the measurement height L1 and the lower limit height L3 are set in the control device 30 (step S2) and the arm lifter 20 is arranged at the lower limit height L3 in the measuring instrument main body 10 (step S3). As noted above, the arm 11 may be brought into proximity with the actual measured object W and by measuring the heights L1 and L2, the measurement height L1 and the drop amount F may be determined and the lower limit height L3 may be defined. Alternatively, the measurement height L1, the drop amount F, and the lower limit height L3 may be defined by visually observing the measured object W and the arm 11. Further, the measurement height L1 and the lower limit height L3 may be defined from the design information of the measured object W and the arm lifter 20 may be arranged based on the defined lower limit height L3. Next, the measuring instrument main body 10 is displaced by the displacement mechanism 8, and the arm 11 is arranged at the measurement height L1, and the stylus 12 contacts the measured object W (step S4).

When the preparation noted above is completed, the scanning measurement of the measured object W is started. In other words, in the state where the stylus 12 is in contact with the surface P1, the scanning measurement is performed by displacing the measuring instrument main body 10 along the surface P1 using the displacement mechanism 8, and the surface P1 of the measured object W is measured by the stylus 12 (step S5). As long as the drop of the arm 11 does not occur at the step D, the scanning measurement of step S5 continues (step S6). On the other hand, when the drop of the arm 11 occurs at the step D, the arm 11 is locked by the arm lifter 20 arranged at the lower limit height L3 and is prevented from any further drop (step S7). The drop of the arm 11 is detected by the control device 30 and the control device 30 displaces the measuring instrument main body 10 to return the arm 11 to the measurement height L1 (or the height L2 of the lower side surface P2), then the scanning measurement of the measured object W is restarted (step S8). The control device 30 ends the measurement operation when the scanning measurement of a designated measurement path is completed (step S9). When resuming the measurement, a new value of the lower limit height L3 may be defined. For example, during measurement of the lower side surface P2, the range of motion of the arm 11 can be restricted at a new lower limit height.

The following advantages can be achieved according to the present embodiment noted above. In the present embodiment, there is a large step D on surfaces P1 and P2 of the measured object W and even when the arm 11 drops from the measurement height L1, the arm 11 is locked by the arm lifter 20 that is arranged at the lower limit height L3 and the damage to the stylus 12 due to a further drop can be prevented. In the present embodiment, the drop of the arm 11 is prevented by providing the arm lifter 20 and a configuration can be simplified without requiring an additional configuration in the surface property measuring device 1. Also, the arm lifter 20 mechanically locks the dropping arm 11 and therefore, the drop of the arm 11 can be reliably prevented. Thus, according to the present embodiment, the drop of the arm 11 during measurement can be prevented without monitoring the displacement speed of the arm 11 and without controlling the measurement force applied to the arm 11.

In the present embodiment, the arm 11 can be arranged at the measurement height L1 of the measured object W by the displacement mechanism 8 that displaces the measuring instrument main body 10. In other words, in order to prepare for the drop of the arm 11 in a state where the arm lifter 20 is arranged at the lower limit height L3, the arm lifter 20 cannot be used to oscillate the arm 11. In response, in the present embodiment, by using the displacement mechanism 8 of the measuring instrument main body 10, the arm 11 can be arranged at the measurement height L1 of the measured object W without using the arm lifter 20. Accordingly, the drop of the arm 11 can be reliably prevented due to the arm lifter 20.

In the present embodiment, the appropriate measurement height L1, drop amount F, and lower limit height L3 can be defined according to the actual measured object W by causing the measured object W and the arm 11 to actually approach each other and by retrieving a height position of the arm 11 using the scale 14 in a measurement state and in a state where the drop at the step D is imitated. In the present invention, the scale 14 detecting the oscillation position of the arm 11 is typically installed in the surface property measuring device 1, and is preferred because the scale 14 can be used easily and the height position of the arm 11 can be obtained directly.

In the present embodiment, the measurement height L1 and the lower limit height L3 can be calculated from the design information of the measured object W. However, when the step D is present on the inner surface of the cylindrical measured object W, for example, it is difficult to visually check the state of the arm 11 with respect to the step D and there is a possibility that the lower limit height L3 cannot be defined properly. In response, by defining the measurement height L1 and the lower limit height L3 using the design information of the measured object W, the drop can be prevented efficiently and reliably.

The present invention is not limited to the embodiment described above, and includes modifications within a scope capable of achieving the advantages of the present invention. In the present embodiment, when the lower limit height L3 and the measurement height L1 are defined, the height position of the arm 11 is retrieved with the scale 14 and the lower limit height L3 and the measurement height L1 are defined. However, a method different from the scale 14 that directly detects the oscillation position of the arm 11 may be used. For example, in the embodiment above, the arm lifter 20 uses the rotation-type cam 22, and the rotation angle position thereof is detected by the encoder and the height position of the arm 11 may be calculated from the encoder output using the data table. In the embodiment, the rotation-type cam 22 is used as the arm lifter 20, however, a configuration is also possible in which the arm 11 is oscillated forcefully by reciprocating a member where the pin 23 is installed in the vertical direction.

The present invention can be used for a surface property measuring method and a surface property measuring device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface property measuring method that uses a surface property measuring device that includes an arm swingably supported so as to displace a stylus vertically, and arm lifter that holds the stylus at a predetermined height by rotating the arm, the method comprising:
    positioning, via the surface property measuring device, the arm lifter such that the arm is positioned at a lower limit height, which is a predetermined drop amount below a predetermined measurement height;
    thereafter positioning, via the surface property measuring device, the arm at the predetermined measurement height such that the stylus contacts a measurable object; and
    thereafter measuring, via the surface property measuring device, surface properties of the measurable object.

2. The surface property measuring method according to claim 1, wherein the surface property measuring device includes a measuring instrument main body in which the arm and the arm lifter are installed, and a displacement mechanism capable of displacing the measuring instrument main body relative to the measurable object, wherein:
    the positioning of the arm lifter further comprises positioning the arm lifter in the measuring instrument main body in a state where the arm is positioned at the lower limit height,
    the thereafter positioning of the arm further comprises displacing, via the displacement mechanism, the measuring instrument main body such that the stylus contacts the measurable object and the arm is positioned at the measurement height.

3. The surface property measuring method according to claim 1, wherein the lower limit height and the measurement height are defined before the positioning of the arm lifter, based on design information of the measurable object.

4. The surface property measuring method according to claim 2, wherein the lower limit height and the measurement height are defined before the positioning of the arm lifter, based on design information of the measurable object.

5. The surface property measuring method according to claim 1, further comprising obtaining a height position of the arm from one of a scale that detects an oscillation position of the arm and an encoder that detects a rotation angle position of a rotation cam of the arm lifter.

6. The surface property measuring method according to claim 2, further comprising obtaining a height position of the arm from one of a scale that detects an oscillation position of the arm and an encoder that detects a rotation angle position of a rotation cam of the arm lifter.

7. The surface property measuring method according to claim 3, further comprising obtaining a height position of the arm from one of a scale that detects an oscillation position of the arm and an encoder that detects a rotation angle position of a rotation cam of the arm lifter.

8. The surface property measuring method according to claim 4, further comprising obtaining a height position of the arm from one of a scale that detects an oscillation position of the arm and an encoder that detects a rotation angle position of a rotation cam of the arm lifter.

9. The surface property measuring method according to claim 5, wherein the positioning of the arm lifter further comprises:
    referencing the obtained height position of the arm while operating the arm lifter; and
    thereafter positioning the arm lifter at the lower limit height when the arm is separated from the arm lifter.

10. The surface property measuring method according to claim 6, wherein the positioning of the arm lifter further comprises:
    referencing the obtained height position of the arm while operating the arm lifter; and
    thereafter positioning the arm lifter at the lower limit height when the arm is separated from the arm lifter.

11. The surface property measuring method according to claim 7, wherein the positioning of the arm lifter further comprises:
    referencing the obtained height position of the arm while operating the arm lifter; and
    thereafter positioning the arm lifter at the lower height when the arm is separated from the arm lifter.

12. The surface property measuring method according to claim 8, wherein the positioning of the arm lifter further comprises:
    referencing the obtained height position of the arm while operating the arm lifter; and
    thereafter positioning the arm lifter at the lower limit height when the arm is separated from the arm lifter.

13. A surface property measuring device comprising:
    an arm swingably supported so as to vertically displace a stylus;
    an arm lifter that holds the stylus at a predetermined height by rotating the arm;
    a measuring instrument main body in which the arm and the arm lifter are installed;
    a displacement motor that displaces the measuring instrument main body relative to a measurable object; and
    a controller that controls the arm, the arm lifter, and the displacement motor, the controller comprising processor and a memory that stores a set of executable instructions, wherein upon execution of the executable instructions by the processor, the controller performs operations comprising:
        positioning the arm lifter such that the arm is positioned at a lower limit height, which is a predetermined drop amount below a predetermined measurement height;
        thereafter displacing the measuring instrument main body with the displacement motor such that the stylus contacts the measurable object and the arm is positioned at the measurement height; and thereafter measuring surface properties of the measurable object.

* * * * *

UNITED STATES PATENT AND TRADEMARK OFFICE
CERTIFICATE OF CORRECTION

PATENT NO. : 11,193,749 B2
APPLICATION NO. : 16/655811
DATED : December 7, 2021
INVENTOR(S) : T. Nakayama It is certified that error appears in the above-identified patent and that said Letters Patent is hereby corrected as shown below:

In the Claims

Column 11, Lines 25-26 (Claim 1) please change "and arm" to -- and an arm --
Column 12, Line 33 (Claim 11) please change "lower height" to -- lower limit height --

Signed and Sealed this
Nineteenth Day of April, 2022

Katherine Kelly Vidal
*Director of the United States Patent and Trademark Office*